United States Patent [19]

Eaton

[11] 4,044,743
[45] Aug. 30, 1977

[54] CANNISTER PURGE VALVE ASSEMBLY

[75] Inventor: Bryan Eaton, Chatham, Canada

[73] Assignee: Fram Corporation, Providence, R.I.

[21] Appl. No.: 668,368

[22] Filed: Mar. 19, 1976

[51] Int. Cl.$^2$ .............................................. F02M 37/00
[52] U.S. Cl. .................................. 123/136; 137/625.5;
251/61.1
[58] Field of Search ....................... 123/136; 251/61.1;
137/625.4; 625.5

[56] References Cited

U.S. PATENT DOCUMENTS

| 3,490,479 | 1/1970 | Mott | 251/61.1 X |
| 3,606,908 | 9/1971 | Riester | 123/136 UX |
| 3,628,570 | 12/1971 | Soberski | 123/136 |
| 3,695,376 | 10/1972 | Fielder | 123/236 X |

FOREIGN PATENT DOCUMENTS 2,306,390  10/1974  Germany ............................ 251/61.1

*Primary Examiner*—Alan Cohan
*Attorney, Agent, or Firm*—Ken C. Decker; William N. Antonis

[57] ABSTRACT

A cannister purge valve assembly for a vehicle emissions control system is disclosed which includes a housing defining a chamber which is divided into a pair of sections by a diaphragm carried by the valve housing. One of the sections has inlets communicated to the vehicle fuel tank and to the vapor absorbing cannister and an outlet which is communicated to engine intake manifold vacuum when the vehicle engine is operating. The other section is provided with an inlet which is communicated to the spark port on the vehicle carburetor so that the other section is communicated to a vacuum level when the engine is running. The inlet communicated to the cannister and the outlet communicated to the intake manifold terminate in a pair of coaxial tubes which extend into the chamber. Corresponding ends of the tube are substantially coplanar to define a valve seating area. A spring yieldably urges the diaphragm into sealing engagement with the valve seating area on the coplanar ends of the tubes, to thereby prevent communication between the two inlets and between either of the inlets and the outlet unless the pressure level in the vehicle fuel tank raises above a predetermined pressure level sufficient to actuate the diaphragm, whereupon the vapor in the fuel tank is absorbed by the cannister. When the vehicle engine is started, the diaphragm moves away from the valve seating area to permit purging of the cannister through the outlet.

9 Claims, 2 Drawing Figures

CANNISTER PURGE VALVE ASSEMBLY

BACKGROUND OF THE INVENTION

This invention relates to a cannister purge valve assembly for a vehicle emission controls valve system.

Existing vehicle emission regulations require that evaporative emissions from the vehicle fuel tank be substantially reduced from current levels. In order to accomplish this reduction in emissions, a cannister is installed on the vehicle and is filled with a desiccant material to absorb vapors which may accumulate in the vehicle fuel tank. However, to minimize the cost of the cannister and the space required for it, a purge valve is necessary. The purge valve normally prevents communication between the fuel tank and the cannister to thereby trap most of the fuel vapors in the fuel tank, but actuates to permit communication between the fuel tank and the cannister when the vapor pressure in the fuel tank rises above a predetermined level. When the vehicle engine is operating, the vapors are purged from the cannister. Other designs for a purge valve of this type have been proposed, but these designs are not able to effectively seal between the various inlets and outlets required on the purge valve housing.

SUMMARY OF THE INVENTION

Therefore, an important object of my invention is to provide a cannister purge valve assembly in which a more effective seal between the inlet and outlet of the valve is provided than is available with prior art designs.

Another important object of my invention is to provide a cannister purge valve assembly in which the outlet to the engine intake manifold vacuum and the inlet from the cannister comprise a pair of coaxial tubes which terminate in a substantially coplanar valve setting area which is adapted to be sealingly engaged by a valve diaphragm.

DETAILED DESCRIPTION

Figure 1:
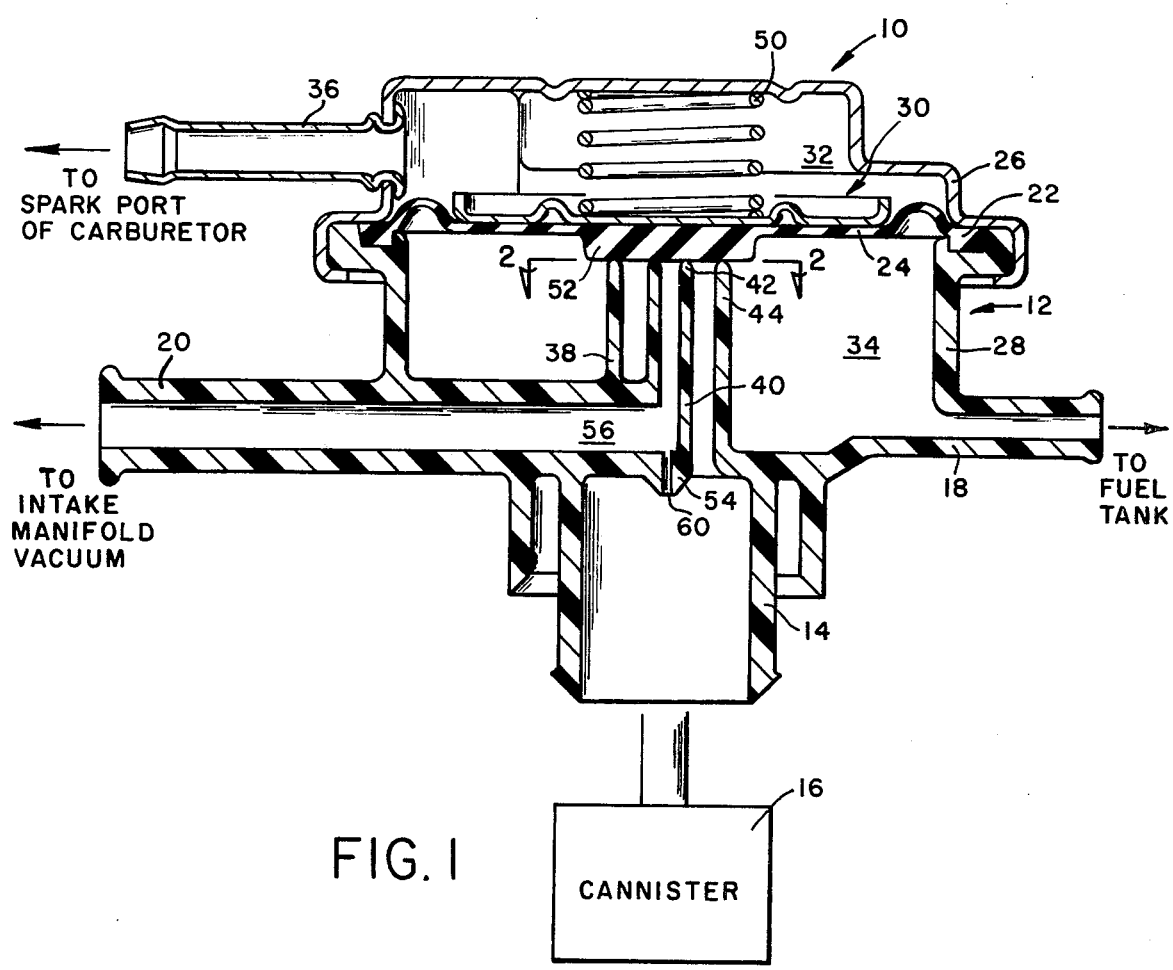
FIG. 1 of the drawing is a cross-sectional view of a purge valve assembly made pursuant to the teachings of my present invention.
Figure 2:
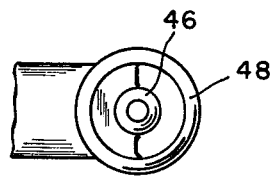
FIG. 2 is a cross-sectional view taken substantially along lines 2—2 of FIG. 1.

Referring now to the drawings, a purge valve assembly generally indicated by the numeral 10 includes a housing 12 having a first inlet port 14 communicated to a cannister assembly 16. The cannister assembly 16 is conventional and includes a simple housing open to the atmosphere in which the fuel vapor absorbing material or desiccant is housed. The housing 12 further includes a second inlet port 18, which is communicated to the sealed fuel tank of the vehicle, and an outlet port 20 which is communicated to engine intake manifold vacuum when the engine of the vehicle is running through the vehicle PCV valve line.

The peripheral edge 22 of a diaphragm 24 is clamped between the upper portion 26 and the lower portion 28 of the housing 12, and divides a chamber 30 defined within the housing 12 into an upper section 32 and a lower section 34. It will be noted that the inlet ports 14 and 18 and the outlet port 20 communicate with the section 34 of the chamber 30, while another port 36 communicates with the upper section 32 of the chamber 30. The port 36 is communicated to the spark port of the vehicle carburetor so that during normal running operation of the vehicle engine (other than at idle), the section 32 will be communicated to a vacuum pressure level.

The inlet 14 and the outlet 20 terminate in a pair of coaxial tubes, which include an outer tube 38 and an inner tube 40 which project into the lower section 34 of the chamber 30. The end 42 of the inner tube 40 is substantially coplanar with the end 44 of the outer tube 38 so that the ends 42, 44 of the tubes 40 and 38 define concentric valve seating surfaces or rings 46, 48. A spring 50 yieldably urges the sealing portion 52 of the diaphragm 24 into sealing engagement with the valve seating surfaces or rings 46, 48 to thereby prevent communication from the lower section 34 of chamber 30 into either the inlet 14 or the outlet 20. The opposite end 54 of the tube 40 terminates in a passage 56 which intersects the outer tube 38.

A flow restricting orifice 60 is provided in the end 54 of the tube 40. The orifice 60 is substantially coaxial with the tubes 40 and 38, and permits limited communication between the inlet 14 and outlet 20 even when the sealing portion 52 of diaphragm 24 sealingly engages the valve seating areas 46, 48.

MODE OF OPERATION

Various components of the purge valve assembly 10 are illustrated in the drawings in the position which they assume when the vehicle engine is off and when the vapor pressure in the vehicle fuel tank is relatively low. In this condition, both the upper section 32 and lower section 34 of the chamber 30 are at substantially the same pressure, thereby permitting the spring 50 to urge the sealing portion 52 of the diaphragm 24 into sealing engagement with the seating surfaces or rings 46, 48, thereby preventing communication between the inlet 18, the inlet 14, and the outlet 20, except for the limited communication permitted through the orifice 60. If the vapor pressure in the vehicle fuel tank increases to some predetermined level sufficient to overcome the force exerted by the spring 50 of the diaphragm 24, the diaphragm 24 will be urged upwardly, viewing the Figure, thereby permitting communication between the chamber 30 and the inlet 14, thereby venting the vapors in the vehicle fuel tank to the desiccant material in the cannister 16. Excess vapors are absorbed by the desiccant material in the cannister, thereby preventing release of the fuel vapors into the atmosphere.

When the engine of the vehicle is started, the upper section 32 of the chamber 30 is communicated to the vacuum level at the spark port of the carburetor, and the outlet 20 is communicated through the vehicle PCV valve line to the vacuum level at the intake manifold of the vehicle engine. Consequently, because of the pressure differential across the diaphragm 24, the latter will be urged upwardly viewing the Figure, against the bias of the spring 50. Consequently, the cannister 16 will be communicated directly to the vacuum level at the engine intake manifold through the inlet 14, the tube 38, the tube 40, and the passage 56. Since the cannister 16 is also communicated to the atmosphere, atmospheric air will be drawn through the cannister 16, thereby purging the desiccant. Because of the concentric design of the tubes 38 and 40, effective sealing between the sealing portion 56 of the diaphragm 24 and the seating areas 46, 48 is assured when the pressure level in the lower section 34 of chamber 30 does not exceed the pressure level in the upper section 32 of the latter by more than the predetermined amount necessary to overcome the bias of the spring 50. Therefore, during engine-off condition, the inlet 14 and outlet 20 are sealed from the engine fuel tank when the vapor pressure in the latter is relatively low, thereby trapping the vapors in the tank. Consequently the size of the cannister 16 may be much smaller than that which would be required if uninhibited communication was permitted between the fuel tank and the cannister 16.

I claim:

1. In a vehicle emissions control system including a cannister containing material for absorbing vapors from the vehicle fuel tank, a purge valve for purging said cannister during normal operation of the vehicle, said purge valve including a housing defining a chamber therewithin, first inlet means communicating said chamber with the cannister, second inlet means communicating said chamber with said fuel tank, outlet means through which the cannister is purged, said first inlet means and said outlet means terminating in inner and outer rings defining valve seating areas on each of said rings, valve means adapted to engage said valve seating areas, and yieldable means urging said valve means into sealing engagement with said valve seating areas to thereby prevent communication between said first and second inlet means to said outlet means until the valve means move away from the seating areas.

2. The invention of claim 1:
said inner and outer rings being substantially coplanar whereby said valve seating areas are substantially flat for engagement by said valve means.

3. The invention of claim 2:
said valve means including a diaphragm extending across said chamber and dividing the chamber into a first section and a second section, said first section being communicated to said first and second inlet means and said outlet means, said second chamber being connected to a vacuum source during normal operation of the vehicle to thereby develop a pressure differential across said diaphragm which urges the latter away from said valve seating area.

4. The invention of claim 3:
said inner and outer rings being concentric.

5. The invention of claim 1:
said first inlet means and said outlet means comprising inner and outer coaxial tubes, one end of said inner tube being substantially coplanar with a corresponding end of the outer tube, the coplanar ends of said tubes defining the inner and outer rings comprising said valve seating areas.

6. The invention of claim 5:
the other end of said inner tube terminating in a passage intersecting said outer tube.

7. The invention of claim 6; and
a flow restricting orifice communicating said outer tube with said inner tube.

8. The invention of claim 7:
said flow restricting orifice extending through the wall of said passage means and being substantially coaxial with said tubes.

9. In a valve, a housing defining a chamber therewithin, first and second inlet means, and an outlet means communicating with said chamber, one of said inlet means and said outlet means comprising inner and outer coaxial tubes extending into said chamber, one end of said inner tube being substantially coplanar with a corresponding end of said outer tube, the coplanar ends of said tubes defining valve seating areas, a diaphragm carried by said housing dividing said chamber into a first and second section, said first section being communicated with said first and second inlet means and said outlet means, resilient means for urging said diaphragm into sealing engagement with said seating areas to prevent communication from said second inlet means to both said first inlet means and said outlet means and to also prevent communication between said first inlet means and said outlet means until the pressure differential across said diaphragm is sufficient to overcome said resilient means to urge said diaphragm out of sealing engagement with said seating areas, the opposite end of said inner tube terminating in a passage intersecting said outer tube, and a flow restricting orifice communicating said outer tube with said inner tube, said flow restricting orifice extending through the wall of said passage means and being substantially coaxial with said tubes.

* * * * *